United States Patent
Ortiz et al.

(10) Patent No.: US 10,694,333 B1
(45) Date of Patent: *Jun. 23, 2020

(54) DETERMINING THE LAST LOCATION OF LOST AND STOLEN PORTABLE ELECTRONIC DEVICES WHEN WIRELESS COMMUNICATIONS ACCESS TO THE LOST OR STOLEN DEVICES IS LOST OR INTERMITTENT

(71) Applicant: OPEN INVENTION NETWORK LLC, Durham, NC (US)

(72) Inventors: Sofia Alexandra Ortiz, Albuquerque, NM (US); Luis M. Ortiz, Albuquerque, NM (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/168,091

(22) Filed: Oct. 23, 2018

Related U.S. Application Data

(63) Continuation of application No. 15/860,178, filed on Jan. 2, 2018, now Pat. No. 10,111,039, which is a
(Continued)

(51) Int. Cl.
*H04W 4/02* (2018.01)
*H04W 4/029* (2018.01)

(52) U.S. Cl.
CPC .......... *H04W 4/025* (2013.01); *H04W 4/029* (2018.02)

(58) Field of Classification Search
CPC ....... H04W 4/02; H04W 64/00; H04W 24/00; H04W 4/00; H04W 8/00
See application file for complete search history.

(56) References Cited

U.S. PATENT DOCUMENTS

| | | | |
|---|---|---|---|
| 7,493,126 B2 * | 2/2009 | Ishii | H04W 4/02 455/456.2 |
| 7,590,418 B1 * | 9/2009 | Thomson | H04W 4/029 455/433 |

(Continued)

OTHER PUBLICATIONS

Windows Phone 7's 'Find My Phone' feature teased in Microsoft video http://www.engadget.com/2010/10/11/windows-phone-7s-find-my-phone-feature-teased-in-microsoft-vi printed Nov. 18, 2014, 3 pages.

*Primary Examiner* — Jinsong Hu
*Assistant Examiner* — Farideh Madani

(57) ABSTRACT

The last known location of a lost or stolen device can be determined based on the device's last communication with a data network. A portable device can be set up to communicate its location to or through a server to a second client after the portable device after at least one of the portable device obtains a wireless connection to a data network and registers a most recent location with the server. A device location based on data network router IP address or GPS. A location can be stored until a subsequent location and/or wireless connection is obtained. The server can be programmed to send at least one of "lost" message, ringtone, lock code and wipe command to a lost or stolen portable device. The server or lost device can be programmed to provide map location information to the second client for last known location of the lost portable device.

9 Claims, 3 Drawing Sheets

Related U.S. Application Data continuation of application No. 14/038,987, filed on Sep. 27, 2013, now Pat. No. 9,860,703, which is a continuation of application No. 13/346,206, filed on Jan. 9, 2012, now Pat. No. 8,548,499.

(60) Provisional application No. 61/431,893, filed on Jan. 12, 2011.

(56) References Cited

U.S. PATENT DOCUMENTS

| | | |
|---|---|---|
| 10,068,440 B2 | 9/2018 | Ortiz et al. |
| 10,111,039 B1* | 10/2018 | Ortiz ................... H04W 4/025 |
| 2002/0084903 A1 | 7/2002 | Chaco |
| 2002/0123307 A1 | 9/2002 | Winarski |
| 2003/0005092 A1 | 1/2003 | Nelson et al. |
| 2003/0071728 A1 | 4/2003 | McDonald |
| 2004/0123998 A1 | 7/2004 | Berglund et al. |
| 2006/0258368 A1* | 11/2006 | Granito ................... G01C 21/00 455/456.1 |
| 2007/0072620 A1* | 3/2007 | Levitan ................... H04W 4/02 455/456.1 |
| 2007/0072623 A1* | 3/2007 | Shyr ....................... G01S 19/05 455/456.1 |
| 2008/0143604 A1 | 6/2008 | Mock et al. |
| 2008/0186162 A1 | 8/2008 | Rajan et al. |
| 2008/0242312 A1 | 10/2008 | Paulson et al. |
| 2008/0309485 A1 | 12/2008 | Raduchel |
| 2009/0204354 A1 | 8/2009 | Davis et al. |
| 2010/0027426 A1 | 2/2010 | Nair et al. |
| 2010/0165961 A1 | 7/2010 | Rosario et al. |
| 2011/0095883 A1* | 4/2011 | Watts ................... B60R 25/1003 340/539.11 |
| 2012/0042046 A1 | 2/2012 | Petersen et al. |
| 2012/0052870 A1 | 3/2012 | Habicher |

\* cited by examiner

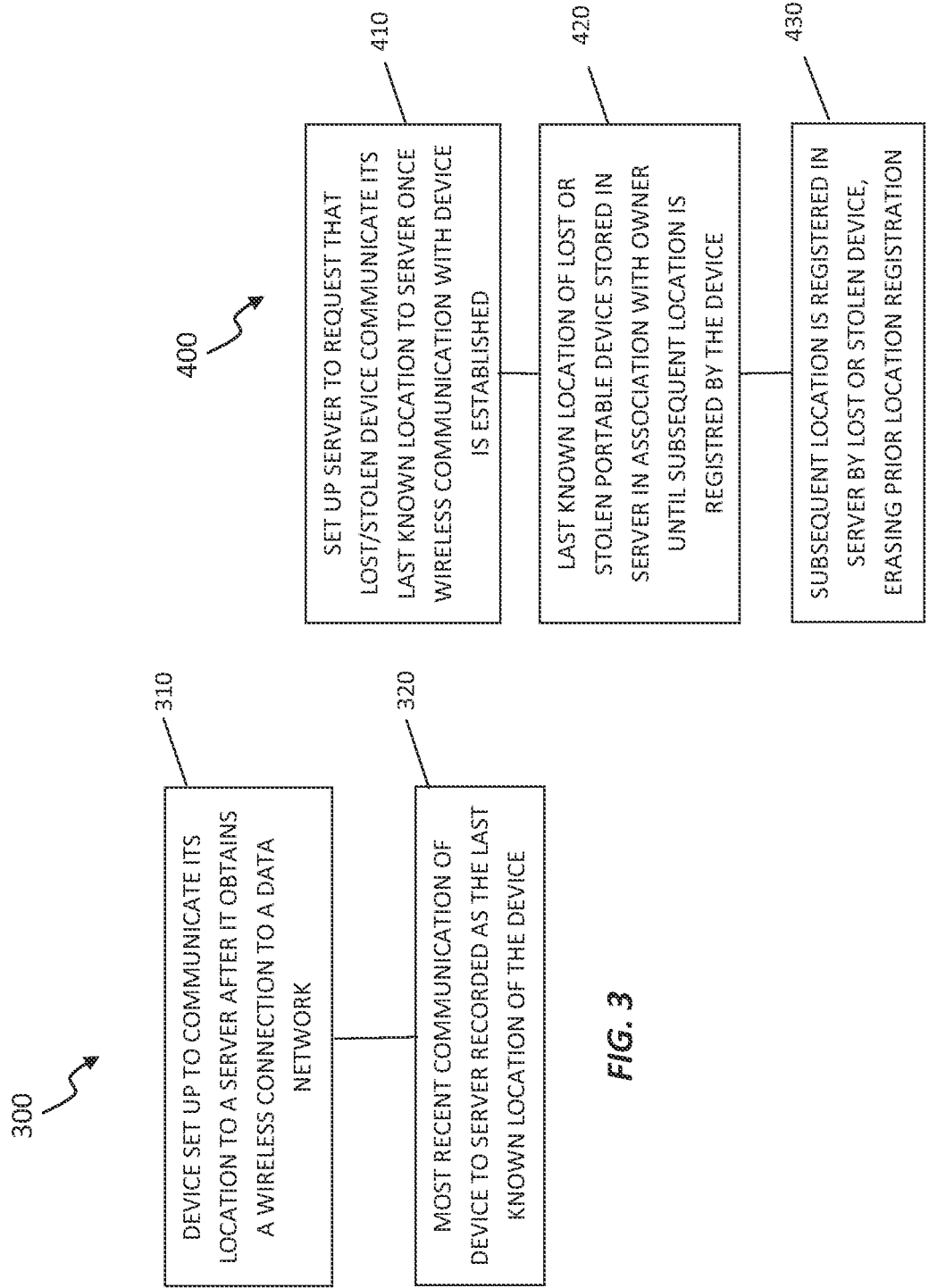

DETERMINING THE LAST LOCATION OF LOST AND STOLEN PORTABLE ELECTRONIC DEVICES WHEN WIRELESS COMMUNICATIONS ACCESS TO THE LOST OR STOLEN DEVICES IS LOST OR INTERMITTENT

CROSS REFERENCE TO RELATED APPLICATIONS

This patent application claims priority as a continuation of U.S. patent application Ser. No. 15/860,178, filed Jan. 2, 2018, entitled "DETERMINING THE LAST LOCATION OF LOST AND STOLEN PORTABLE ELECTRONIC DEVICES WHEN WIRELESS COMMUNICATIONS ACCESS TO THE LOST OR STOLEN DEVICES IS LOST OR INTERMITTENT", issued as U.S. Pat. No. 10,111,039 on Oct. 23, 2018, which is a continuation of U.S. patent application Ser. No. 14/038,987, filed Sep. 27, 2013, entitled "DETERMINING THE LAST LOCATION OF LOST AND STOLEN PORTABLE ELECTRONIC DEVICES WHEN WIRELESS COMMUNICATIONS ACCESS TO THE LOST OR STOLEN DEVICES IS LOST OR INTERMITTENT", issued as U.S. Pat. No. 9,860,703 on Jan. 2, 2018, which is a continuation of U.S. patent application Ser. No. 13/346,206, filed Jan. 9, 2012 entitled "DETERMINING THE LAST LOCATION OF LOST AND STOLEN PORTABLE ELECTRONIC DEVICES WHEN WIRELESS COMMUNICATIONS ACCESS TO THE LOST OR STOLEN DEVICES IS LOST OR INTERMITTENT", issued as U.S. Pat. No. 8,548,449 on Oct. 1, 2013, which is a continuation application of U.S. Provisional Patent Application No. 61/431,893 by the same title, filed Jan. 12, 2011, which are all incorporated herein by reference.

FIELD OF THE INVENTION

The present invention is generally related to systems and methods for finding/locating lost items. The present invention is further related to systems and methods for determining the location of lost and stolen portable electronic devices. More particularly, the present invention is related to methods and systems for determining the last location lost and stolen portable electronic devices when wireless communications access to the lost or stolen devices is lost or intermittent.

BACKGROUND

Portable electronic devices such as smartphones, personal digital assistants, laptop computers, and electronic tablets have become ubiquitous in modern societies. Their use is common among most working adults as well as senior citizens and many children. Portable devices such as tablet computers and handheld computers enables user, among other things, to watch video, access the Internet, communicate with remote friends family and associates, read electronic books and listen to music. Many portable electronic devices include electronics and wireless communications that enable access to and communications through wireless data networks. The problem with the small size of, albeit great appeal to, these very useful portable electronic devices is that they can become easily lost or stolen, resulting in a substantial loss of data by and value to their owners.

Portable device tracking and locating systems and methods are offered by some companies. For example Apple Computer Corporation provides its subscribers the MobileMe™ services, which enables iPhone, iPad, iPod and iTouch users to find their lost or misplaced portable devices on a map via the Internet. The location of lost devices can be found on a map if a finding option (e.g., "Find My iPhone") is enabled in the MobileMe settings of the portable device. When this feature is enabled, a user can use any computer to sign into a secured "me.com" website account, or by using the Find My iPhone application on another iPhone, to display the approximate location of the lost device on a full-screen map. The MobileMe application also enables users to provide a message on the screen of the lost device and play a sound to help the owner or a stranger near the phone to find the device. The unique message can provide the stranger a number to call so that the device can be returned to the owner. The message will appear on the screen of the lost device even if it is locked. MobileMe also allows a sound to override the ringer volume or silent setting on the lost device so that it can be physically located.

Other features provided by the MobileMe application are the ability to set a passcode lock remotely and to remotely wipe all data from the device. A four-digit passcode lock can prevent people that have found or stolen a portable device from using it or accessing personal information from it. Remote Wipe assures that very sensitive data is permanently removed from the lost device in the event it is not feasible to recover it or it is no longer recoverable. If a displayed message doesn't result in the device being returned, remote wipe will assure the user's sensitive data does not fall into the wrong hands. Should the device be returned, data wiped, the data can be restored when connected and synchronized to a user's account with the computer.

The problem with current device location services is that they all depend on continuous data network communications with the lost devices when their location is being determined. If the Wi-Fi feature on a device is not always kept one, or the devices battery runs out on a misplaced device, the location can no longer be determined. A user may not know that their device is missing until some time has passed and the lost device is no longer in communication with a wireless network. What is needed, therefore, are systems and/or methods that enable the last known location of a lost device to be reported to the device user/owner.

SUMMARY

The present invention provides methods and systems for determining the last known location of a lost or stolen portable electronic device based on the device's last communication with a wireless data network. Communication can be with a second client associated with an owner of the portable device using electronic messaging each time a portable device obtains a new wireless connection to a wireless data network.

In accordance with a feature of the present invention, a portable electronic device and/or a server can be set up to communicate the lost device location to a second client associated with the owner of the device a server tracking its location after the device obtains a connection to a wireless data network.

In accordance with yet another feature of the present invention, a lost or misplaced device can be set up to communicate its location based on at least one of wireless data network router IP address location or portable device GPS location after the device obtains a wireless connection to data network.

In accordance with another feature of the present invention, a device can be set up to communicate its location to a server after it obtains a wireless connection to a data network and the location is stored until a subsequent location is registered.

In accordance with a feature of the present invention, a device can be set up to receive a "locate" command from a remote server after the device obtains a wireless connection to a data network and communicates its location to the server in response to the request.

In accordance with another feature of the present invention, a portable device can be set up to communicate its location to at least one of a server or through a server to an owner of the portable device using electronic messaging (e.g., email, SMS text messaging) after the portable device obtains a wireless connection to data network.

In accordance with another feature of the present invention, a portable device can be set up to communicate its last known location to at least one of a server or through a server to an owner of the portable device using electronic messaging (e.g., email, SMS text messaging) after the portable device obtains a wireless connection to data network.

In accordance with another feature of the present invention, a server can be programmed to request a portable device to communicate its last known location to the server or through a server to an owner of the portable device using electronic messaging (e.g., email, SMS text messaging) after the portable device obtains a wireless connection to data network and the location is stored until a subsequent location is registered.

In accordance with yet another feature of the present invention, a server can be programmed to send at least one of "lost" message, ringtone, lock code and wipe command to a lost portable device and also requests a portable device to communicate its last known location to the server or through a server to an owner of the portable device using electronic messaging (e.g., email, SMS text messaging) after the portable device obtains a wireless connection to data network and the location is stored until a subsequent location is registered.

DRAWINGS

FIG. 3 illustrates a flow diagram 200 of a method for determining the last known location of a lost or stolen device based on the lost or stolen device's last communication with a data network in accordance with features of the invention; and FIG. 4 illustrates a method for determining the last known location of a lost or stolen device based on the lost or stolen device's last communication with a data network.

DETAILED DESCRIPTION

Figure 1:
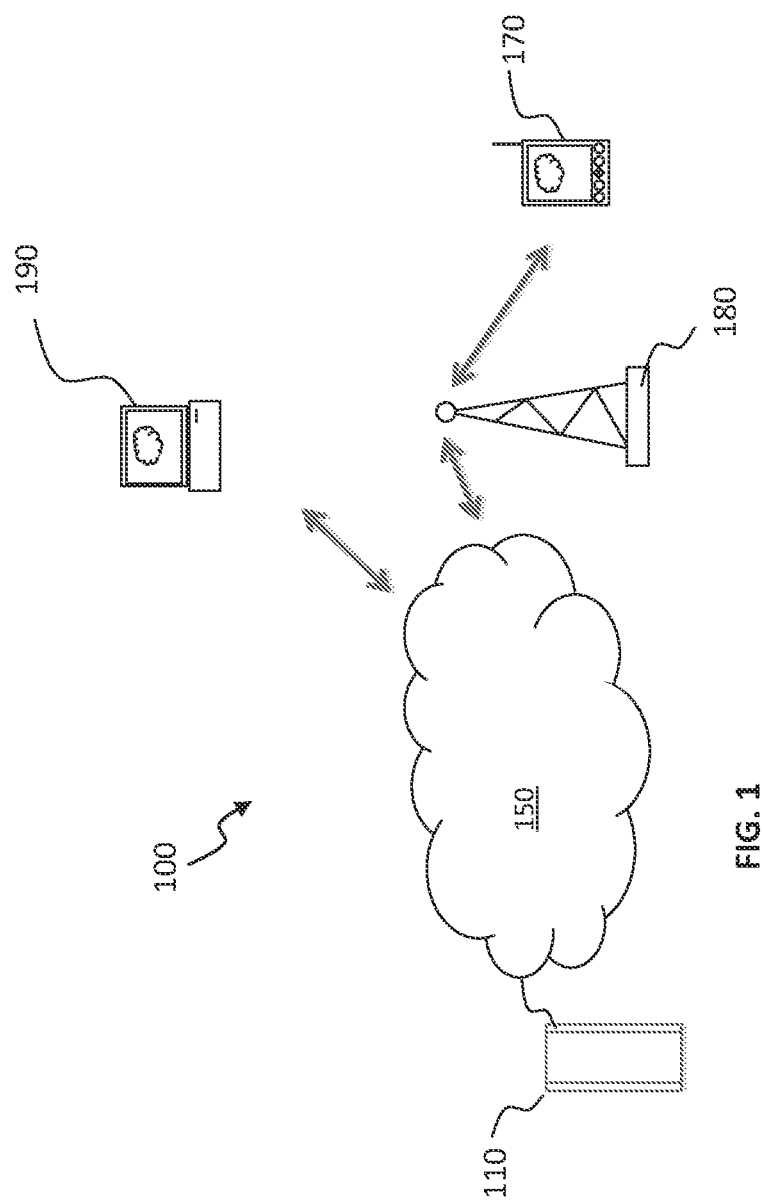
FIG. 1 illustrates a system for determining the last known location of a lost or stolen device based on the lost or stolen device's last communication with a data network.
Figure 2:
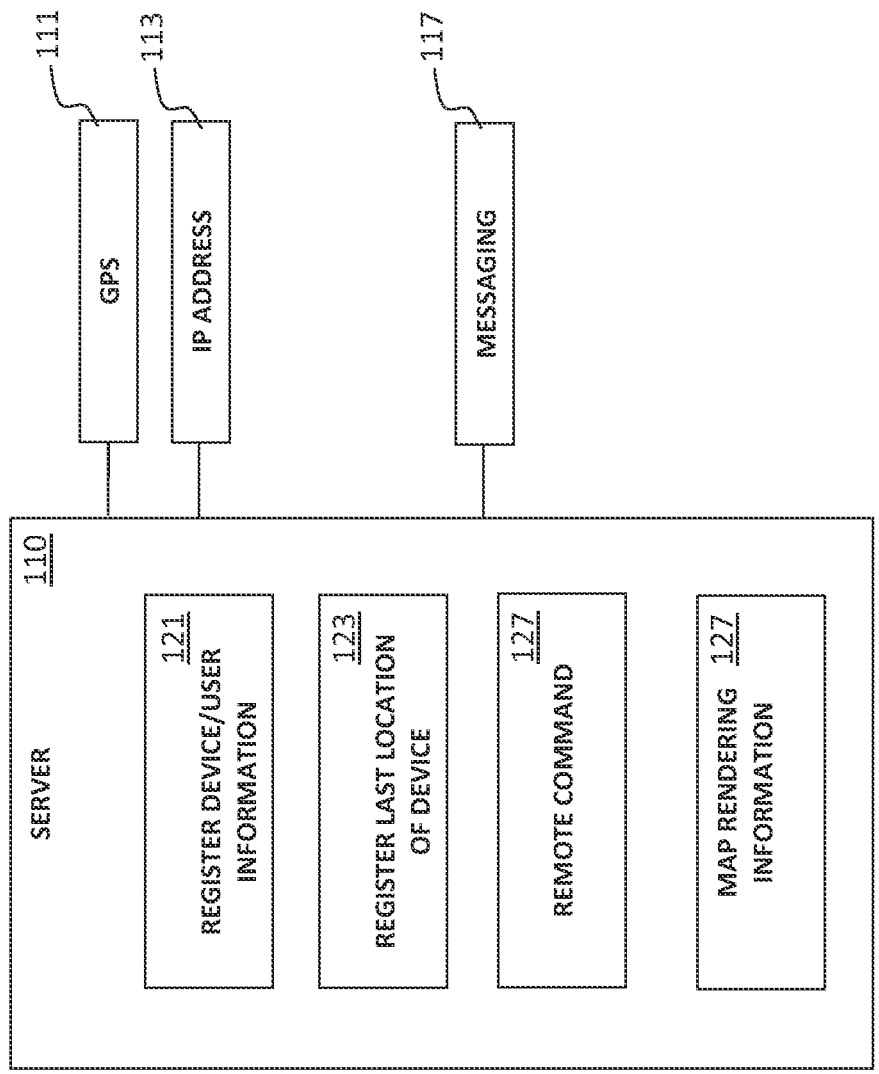
FIG. 2 illustrates a block diagram of modules for a server programmed in accordance with features of the present invention.

Referring to FIG. 1, a system 100 for determining the last known location of a lost or stolen device based on the lost or stolen device's last communication with a data network is shown. The system includes a server 110 programmed to register portable devices and portable device owner information in a memory 115 and communications hardware 160 providing access to a data communications network 150. Referring to FIG. 2, the server 110 can be programmed to communicate with portable devices/user information 121 and to register the last known device location 123. Lost or stolen device location can be determined using device GPS information 111 and/or network hardware IP address 113 information, which can include the ability to determine physical address information. Referring again to FIG. 1, portable devices 170 and can be programmed to communicate their location to a server 110 after the portable device 170 obtains a wireless connection to a data network 150 and registers a most recent communication with the server 110 that includes the last known location of the device 170.

A portable device 170 can be set up to communicate its location to a server 110 after it obtains a wireless connection to a data network 150 and register a most recent communication with the server 110 that includes the last known location of the device 170. A portable device 170 can be set up to communicate its location based on at least one of wireless data network router IP address location or portable device GPS location after the device obtains a wireless connection to a data network 150. A device location is stored until a subsequent location is registered in the server 150.

Referring again to FIG. 2, the server 110 can also be programmed to providing map rendering information 127 for a remote client 190, as shown in FIG. 1, that is being used by the owner of the lost device to find the lost or stolen device. The last known location of the lost portable device 170 to be rendered on a computer generated map generated by a second client 190 based on at least one of: device GPS location, registered Wi-Fi hotspot location, registered router location, connected hardware IP address.

The server 110 can also be programmed with a remote command module 127 to send at least one of "lost" message, ringtone, lock code (E.g., four digit passcode) and memory wipe command to a lost or stolen portable device 170. Communication can be provided to/from portable devices 170 and a server over data networks including wireless data networks using wireless data communications by the portable devices 170. A portable device's last known location can be provided to user/owners on a map (based on device GPS location, registered WiFi hotspot location, registered router location, IP address) or can be recorded on the server or communicated to the device owner using messaging services (e.g., email, SMS) or can be recorded on the server for the owner to retrieve when the owner/user subsequently accesses the server 110.

Referring to FIG. 3, a flow diagram 300 of a method for determining the last known location of a lost or stolen device based on the lost or stolen device's last communication with a data network in accordance with features of the invention is shown. A device can be set up to communicate its location to a server after it obtains a wireless connection to a data network, as shown in step 310. Then, as shown in step 320, the most recent communication of the device to the server is recorded in the server as the last known location of the device. A device can be set up to communicate its location based on at least one of wireless data network router IP address location or portable device GPS location after the device obtains a wireless connection to a data network. A device can be set up to communicate its location to a server after it obtains a wireless connection to data network. A device can also be set up to communicate its location based on at least one of wireless data network router IP address location or portable device GPS location after the device obtains a wireless connection to data network. A device can also be set up to communicate its location to a server after it obtains a wireless connection to data network and the location is stored until a subsequent location is registered in the server. A portable device can also be set up to receive a "locate" command from a remote server after the device obtains a wireless connection to a data network and communicates its location to the server in response to the request. Finally, a portable device can be set up to communicate its location to at least one of a server or through a server to an owner of the portable device using electronic messaging after the portable device obtains a wireless connection to a wireless data network.

Referring to FIG. 4, a method for determining the last known location of a lost or stolen device based on the lost or stolen device's last communication with a data network is illustrated. As shown in step 410, a server can be set up (programmed) to request that a lost or stolen portable device communicate its last known location to the server or through a server to an owner of the lost or stolen portable device using electronic messaging after the lost or stolen portable device obtains a wireless connection to a wireless data network. The last known location of the lost or stolen portable device can be stored in the server, as shown in step 420, in association with a registered owner of the lost or stolen portable device until a subsequent location is registered by the lost or stolen portable device. As shown in step 430, a subsequent location of a lost or stolen device is registered in the server, thereby erasing the previous location registered in the server. The server can also be programmed to send at least one of "lost" message, ringtone, lock code and wipe command to a lost or stolen portable device and also request the lost or stolen portable device to communicate its last known location to the server or through the server to the owner of the lost or stolen portable device using electronic messaging after the lost or stolen portable device obtains a wireless connection to the server via a wireless data network and the location is stored until a subsequent location is registered.

The invention claimed is:

1. A method, comprising:
   receiving, via a server, and from a second device associated with a portable device, a command to identify a location of the portable device;
   transmitting, via the server, a request to the portable device that the portable device communicate a last known location of the portable device when a new wireless communication with the server is established;
   receiving, via the server, a communication indicating the last known location of the portable device in response to the request;
   storing, via the server, the last known location;
   transmitting, via the server, the last known location of the portable device to the second device via short message service (SMS) messaging;
   transmitting, via the server, map rendering information to the second device to display the last known location via a display of the second device;
   identifying, via the server, a current location of the portable device location based on at least one of an identification of a wireless data network router Internet Protocol address location of the portable device or an identification of a Global Positioning Satellite location of the portable device;
   overwriting, via the server, the stored last known location with the current location;
   transmitting, via the server, the current location to the second device via SMS messaging; and transmitting, via the server, map rendering information to the second device to display the current location via a display of the second device.

2. The method of claim 1, wherein the receiving, a communication indicating the last known location of the portable device comprises at least one of:
   receiving a communication via a same wireless network as was used in the transmitting the request; or
   receiving a communication via a different wireless network than was used in the transmitting the request.

3. The method of claim 1, further comprising:
   transmitting the current location to the server via at least one of:
   a communication via a same wireless network as was used in the transmitting the request; or
   receiving a communication via a different wireless network than was used in the transmitting the request.

4. The method of claim 1, wherein the transmitting the request to the portable device further comprises:
   transmitting the request from the server after the portable device establishes the new wireless connection.

5. The method of claim 1, wherein the transmitting the last known location of the portable device to the second device and the transmitting the current location to the second device each comprise:
   transmitting via electronic messaging.

6. A system, comprising:
   a portable device registered to a device owner;
   a second device registered to the device owner; and
   a server programmed to:
      register device owner information, portable device information, and second device communication information associated with the portable device owner;
      transmit a request to the portable device that the portable device communicate a last known location of the portable device when a new wireless communication with the server is established;
      identify a last known location of the portable device based on a last communication between the portable device and the server received through a wireless data network in response to the request;
      store the last known location;
      transmit the last known location of the portable device to the second device via short message service (SMS) messaging;
      transmit map rendering information to the second device to display the last known location via a display of the second device;
      identify a current location of the portable device location based on at least one of an identification of a wireless data network router Internet Protocol address location of the portable device or an identification of a Global Positioning Satellite location of the portable device;
      overwrite the stored last known location with the current location;
      transmit the current location to the second device via short message service (SMS) messaging; and
      transmit map rendering information to the second device to display the current location via a display of the second device.

7. The system of claim 6, wherein the map rendering information being based on at least one of:
   Global Positioning Satellite location information related to the portable device, a registered Wi-Fi hotspot location information related to the portable device, a registered router location information related to the portable device, or a connected hardware Internet protocol address information related to the portable device.

8. The system of claim 6, wherein, when the server is programmed to transmit the last known location of the portable device or transmit the current location to the second device, the server is programmed to:

transmit via a messaging service.

9. The system of claim 6, wherein, when the server is programmed to transmit the request, the server is further programmed to:

transmit the request after the portable device establishes the "new wireless connection.

* * * * *